June 23, 1970  V. L. HEETER ET AL  3,516,884
METHOD OF BEDDING PANELS INTO FRAMES USING
AN ADHESIVE COATED PREFORM
Filed March 28, 1966
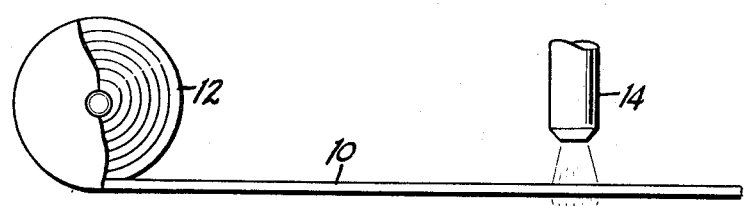
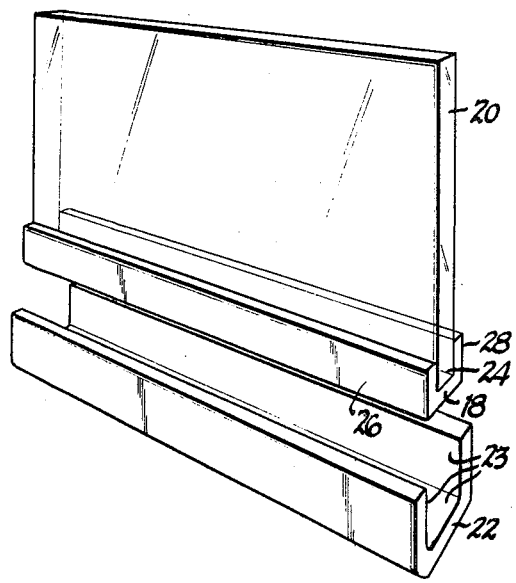
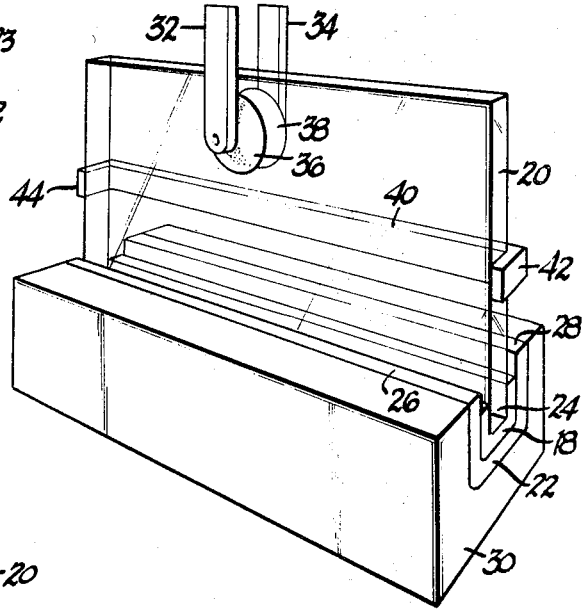
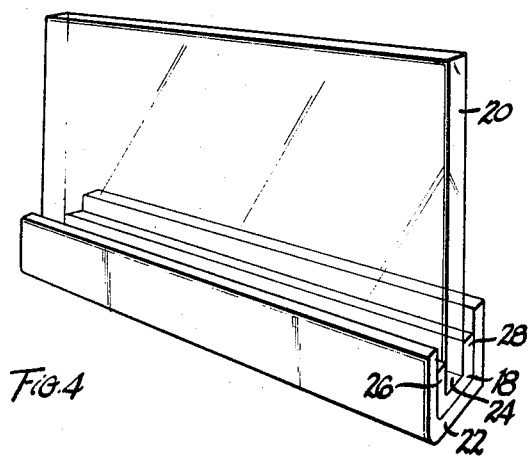
INVENTORS
VICTOR L. HEETER
BY HOWARD J. SHOCKEY
WILSON, SETTLE, BATCHELDER
ATT'YS. & CRAIG

United States Patent Office 3,516,884
Patented June 23, 1970

3,516,884
METHOD OF BEDDING PANELS INTO FRAMES USING AN ADHESIVE COATED PREFORM
Victor L. Heeter and Howard J. Shockey, Elkhart, Ind., assignors to Excel Corporation, Elkhart, Ind., a corporation of Indiana
Filed Mar. 28, 1966, Ser. No. 537,993
Int. Cl. C03c 27/04; C09j 5/06
U.S. Cl. 156—106                                 2 Claims

ABSTRACT OF THE DISCLOSURE

The method of bedding panels into frames is accomplished by first applying curable adhesive material to both sides of a flexible bedding strip. The bedding strip is then applied to a marginal edge of a panel. The marginal edge of the panel is then inserted into the recess of a frame to thereby place the bedding strip in contact with the interior surface of the frame. The adhesive material on the strip is then caused to cure. The bedding strip is thus bonded to the panel edge and to the frame to result in a bed for the panel in the frame.

CROSS-REFERENCE TO RELATED APPLICATION

This application is related to a co-pending application of Robert J. Deisenroth, Ser. No. 222,590, filed Sept. 10, 1962, now Pat. No. 3,263,014, issued July 26, 1966, and assigned to the present assignee.

BACKGROUND OF THE INVENTION

For some time, glass panels for automobile windows have been bedded into frames by the use of rubber strips. A worker folds a rubber strip over a marginal edge of a glass panel, and then inserts the rubber covered edge into a recess in the frame. The rubber provides a resilient seat for the panel in the frame, but there is no positive bonding of the panel to the frame. As a consequence, it is possible for the frame to come off, particularly if the rubber deteriorates due to weathering (that is, temperature changes, moisture absorption and sunlight).

The present invention provides a method of bedding wherein flexible strips are used to bed a panel into a frame, but the strips are coated or impregnated with adhesive material which positively bonds the strip to the panel and to the frame. According to this method, adhesive material is applied to a flexible strip which is either non-porous or porous in nature to provide adhesive material at both sides of the bedding strip available for bonding to the panel and to the frame. The adhesive material may be applied by coating both sides of the flexible strip or, if the strip is porous, by impregnating these strips throughout with adhesive material. Preferably, the adhesive material is a liquid at the time it is applied to the bedding strip, and the adhesive material is set-up to a solid form in which it is adherent to both the glass panel and the metal frame.

The adhesive material may be one which is set-up by heat or by a chemical action without heat, and in either case it should cure to a rigid condition to provide a solid bed for the panel in the frame. A strip with adhesive on it is folded over a marginal edge of the panel and the panel is then inserted into the frame. If the adhesive material is set-up by heat, the assembly of frame, panel and adhesive bearing strip is heated to cure the adhesive material to its solid form. If the adhesive material is chemically curable, the assembly is merely aged to allow the curing action to take place. In either case, the final adhesive material provides a firm bond between the panel and the frame and a bed for the panel in the frame.

Accordingly, it is an object of this invention to provide a method of bedding a panel into a frame by the use of adhesive strips.

Another object of the invention is to provide a method of bedding a panel into a frame by adhesively bonding a flexible strip between and to the panel and the frame.

Another object of the invention is to provide a method of bedding a panel into a frame by applying adhesive material to both sides of a flexible strip, placing the adhesive bearing strip between and in contact with the panel and the frame and setting-up the adhesive material on the strip to bond the strip to and between the panel and the frame.

Other objects of this invention will appear in the following description and appended claims, reference being had to the accompanying drawings forming a part of this specification wherein like reference characters designate corresponding parts in the several views.

On the drawings:

FIG. 1 is a schematic view showing liquid adhesive material being applied through nozzles to a flexible strip;

FIG. 2 is a perspective view showing an adhesive bearing strip being folded about an edge of a panel with the panel in position to be inserted into a channel-shaped frame;

FIG. 3 is a perspective view showing the panel, frame and strip in assembled condition together with fixturing for supporting and positioning the panel and frame assembly; and FIG. 4 is a perspective view of the completed assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIG. 1, a strip of flexible material 10 is being unwound from a roll 12 and passed between nozzles 14 and 16. Liquid adhesive material is applied through the nozzles to both sides of the strip 10, thereby providing coatings of adhesive material on both sides of the strip. Adhesive material might be applied to the strip 10 in other ways; for example, by brushing, rolling, or immersing the strip in a bath of adhesive material. The strip 10 may be either non-porous or relatively porous, and in the case of a porous strip, the adhesive material impregnates the strip by filling the pores.

FIG. 2 shows an adhesive strip 18 being folded about one edge of a panel 20, the adhesive strip 18 being a piece of the longer strip 10 shown in FIG. 1. The strip 18, which is coated or impregnated with adhesive material, is attached to the bottom edge 24 of panel 20, and the sides 26 and 28 of the strip are folded up and into contact with the sides of panel 20 near its bottom edge 24. The panel and the strip are then inserted together into the channel-shaped frame 22 such that the bottom edge 24 of the panel and the entire strip 18 are received within the recess formed by the side and bottom surfaces 23 of frame member 22. At this stage, the adhesive on one side of the strip 18 is in contact with the panel 20 and the adhesive on the other side of the strip 18 is in contact with the frame member 22. The panel 20 is made of glass, and the frame 22 is made of metal. The adhesive material is one which bonds well both to metal and to glass.

FIG. 3 shows the panel 20, the strip 18 and the frame 22 in assembled condition and supported by fixture apparatus. The frame 22 is seated in a fixture block 30 which has a recess conforming to the shape of the frame member. The panel 20 is supported by arms 32 and 34 which have suction cups 36 and 38 attached respectively to opposite sides of the panel. The panel 20 is centered and retained against movement lengthwise of the frame by an arm 40 which has inwardly bent end portions 42 and 44 embracing the panel 20. The centering arm 40 may be coated with rubber material to keep it from marring the glass panel.

The term "set-up" as used in this description means the chemical action which takes place in curing a thermosetting resin to its final form (accomplished either by use of catalysts or heat) or the process of melting a thermoplastic resin to cause adherence thereof to the panel and frame. If the adhesive material is one which cures by chemical action, the panel, strip and frame assembly may merely be allowed to remain in the fixturing apparatus while the curing process takes place. The fixturing apparatus holds the elements in the proper positions during the curing process.

If, on the other hand, the adhesive material is one which is set-up by heat, the entire assembly of FIG. 3 may be placed in an oven maintained at an elevated temperature for a time sufficient to set-up the adhesive material to a solid condition in which it adheres to the glass panel and the metal frame. For a specific material, the oven temperature may be about 250° to 300° F. and the assembly may remain in the oven for about 45 seconds. It is possible to heat the adhesive material in other ways. For example, cartridge heaters may be built into the fixture block 30 to heat the metal frame 22 which in turn heats the adhesive material in contact therewith. The frame might be heated directly by current passing through it, or it may be heated by high frequency induction heating.

In the case of adhesive materials set-up by heat, the adhesive may be either a thermosetting resin or a thermoplastic resin which has the following properties:

(1) Resiliency—to provide a suitable bedding for the glass.

(2) Adherence—to provide a bond between the glass and the metal frame.

(3) Set-up—to a solid state in a relatively short time by the application of heat, for example, within about 45 seconds at about 250° F.

(4) Resistance to weathering (sunlight, temperature changes and moisture absorption).

(5) Mechanical properties such as tensile strength, compressive strength, impact resistance and toughness sufficient to withstand the stresses normally encountered in use of the final assembly.

One class of resins suitable as adhesive materials for the method of the invention are the polyurethane resins. Polyurethane resins are obtained by the reaction of polyisocyanates with organic compounds containing two or more active hydrogens to form polymers having free isocyanate groups. Under the influence of heat, the free isocyanate groups react to form a thermosetting material. A suitable thermosetting form may be prepared from castor oil and a triisocyanate. A suitable thermoplastic material is polyvinyl resin.

FIG. 4 shows the final assembly of panel 20, frame 22 and adhesive strip 18. The adhesive strip extends along the bottom edge 24 of the panel 20 and has portions 26 and 28 extending a short distance up the sides of the panel, all of the strip being located within the recess formed by surfaces 23 (FIG. 2) of the frame 22. The strip 18 is strongly bonded by the adhesive material both to panel 20 and to frame 22.

Thus, the invention provides a method of bedding a panel into a frame by adhesively bonding a strip between the panel and the frame. As the result, the panel has a solid, durable bed in the frame provided by the combination of adhesive material and strip material. The strip material acts as a filler and vehicle for the adhesive material which in turn bonds adherently to both the glass of the panel and the metal of the frame.

We claim:

1. A method of bedding a panel into a frame having an interior surface defining a recess for receiving and edge of said panel, said method comprising the steps of applying liquid adhesive material to a flexible bedding strip so as to provide adhesive material at both sides of said bedding strip available for bonding to said panel and said frame respectively, assembling said panel, said strip and said frame to provide an assembly wherein a marginal edge of said panel is located in said recess of said frame and said bedding strip is between and in contact with said panel edge and said interior surface of said frame, said assembling being accomplished by applying said bedding strip to the marginal edge of the panel by folding said strip transversely thereof about said panel edge for subsequent location in said recess and heating the adhesive material on said strip to set-up and thereby bond said bedding strip to and between said panel edge and said frame.

2. The method of claim 1 in which said bedding strip is porous in nature and said application of adhesive material to said bedding strip is carried out by impregnating said bedding strip throughout with adhesive material.

References Cited

UNITED STATES PATENTS

| 1,999,441 | 4/1935 | Clark | 156—313 |
|---|---|---|---|
| 2,733,789 | 2/1956 | Tolle | 156—293 X |
| 2,768,475 | 10/1956 | Seelen et al. | 156—109 X |
| 3,098,698 | 7/1963 | Glynn | 264—261 |
| 3,263,014 | 7/1966 | Deisenroth | 264—261 |
| 3,272,900 | 9/1966 | Ryan et al. | 264—261 X |

HAROLD ANSHER, Primary Examiner

M. E. McCAMISH, Assistant Examiner

U.S. Cl. X.R.

156—212, 293, 306, 313